(12) United States Patent
Hirose et al.

(10) Patent No.: US 9,115,813 B2
(45) Date of Patent: Aug. 25, 2015

(54) FLUID CONTROL DEVICE

(75) Inventors: Takashi Hirose, Osaka (JP); Hiroshi Ogawa, Osaka (JP); Toshihide Yoshida, Osaka (JP); Kohei Shigyou, Osaka (JP)

(73) Assignee: FUJIKIN INCORPORATED, Osaka-shi (JP)

( * ) Notice: Subject to any disclaimer, the term of this patent is extended or adjusted under 35 U.S.C. 154(b) by 0 days.

(21) Appl. No.: 13/575,951

(22) PCT Filed: Dec. 9, 2010

(86) PCT No.: PCT/JP2010/072105
§ 371 (c)(1),
(2), (4) Date: Jul. 28, 2012

(87) PCT Pub. No.: WO2011/096132
PCT Pub. Date: Aug. 11, 2011

(65) Prior Publication Data
US 2012/0319024 A1    Dec. 20, 2012

(30) Foreign Application Priority Data
Feb. 5, 2010    (JP) ................................. 2010-023676

(51) Int. Cl.
*F16K 7/14*    (2006.01)
*F16K 31/122*    (2006.01)

(52) U.S. Cl.
CPC ............... *F16K 7/14* (2013.01); *F16K 31/1225* (2013.01); *F16K 31/1226* (2013.01)

(58) Field of Classification Search
USPC .................... 251/62, 63, 63.5, 63.6
See application file for complete search history.

(56) References Cited

U.S. PATENT DOCUMENTS

| | | | | |
|---|---|---|---|---|
| 5,186,434 A | * | 2/1993 | Nishimura et al. | 251/331 |
| 6,138,712 A | * | 10/2000 | Hirose | 137/559 |
| 6,189,861 B1 | * | 2/2001 | Gotch et al. | 251/331 |
| 6,244,562 B1 | * | 6/2001 | Ejiri | 251/63.6 |
| 6,397,892 B1 | * | 6/2002 | Pyle et al. | 137/637.2 |
| 6,932,315 B2 | * | 8/2005 | Ejiri | 251/14 |
| 6,986,362 B2 | * | 1/2006 | Cheong | 137/491 |
| 8,256,744 B2 | * | 9/2012 | Tanikawa et al. | 251/331 |
| 2002/0158217 A1 | | 10/2002 | Inoue et al. | |
| 2004/0007683 A1 | * | 1/2004 | Willetts | 251/63.6 |
| 2006/0191777 A1 | * | 8/2006 | Glime | 200/81 R |
| 2007/0007475 A1 | * | 1/2007 | Zvokelj et al. | 251/63.6 |
| 2010/0163765 A1 | * | 7/2010 | Gregoire | 251/62 |
| 2013/0001453 A1 | * | 1/2013 | Hirose et al. | 251/285 |
| 2013/0181148 A1 | * | 7/2013 | Tokuda et al. | 251/63.6 |

FOREIGN PATENT DOCUMENTS

| | | |
|---|---|---|
| CN | 1365436 A | 8/2002 |
| JP | 2000-009254 A | 1/2000 |
| JP | 2001-271961 A | 10/2001 |

OTHER PUBLICATIONS

Office Action dated Jun. 18, 2013, issued for the Chinese patent application No. 201080065200.5.

* cited by examiner

*Primary Examiner* — John K Fristoe, Jr.
*Assistant Examiner* — Daphne M Barry
(74) *Attorney, Agent, or Firm* — Locke Lord LLP

(57) ABSTRACT

This invention provides a fluid control device which is capable of visually recognizing its opening and closing states with a simple configuration. The casing 3 is formed so as to be opened upward. The piston 8 is disposed at an upper end portion of a valve rod 7 such that a piston upper end portion is exposed from an opening of the casing 3 when the valve rod 7 is located at the upper position.

8 Claims, 6 Drawing Sheets

FLUID CONTROL DEVICE

TECHNICAL FIELD

The present invention relates to a fluid control device, specifically to a fluid control device whose opening and closing states of a fluid passage can be visually recognized.

BACKGROUND ART

As a fluid control device, there is well known a device including a body in which a fluid passage is disposed, a casing which is disposed above the body, a valve body which opens and closes the fluid passage, a valve rod which moves upward or downward so as to move the valve body in an opening or closing direction, a piston which is disposed at the valve rod, and a piston driving unit which drives the piston. In such a fluid control device, its opening and closing states cannot be seen from the outside. Accordingly, in Patent Literature 1, there is proposed a fluid control device to which a function of indicating opening and closing states is conferred.

CITATION LIST

Patent Literature

Patent Literature 1: Japanese Patent Application Laid-Open No. 2000-9254

SUMMARY OF THE INVENTION

Problems to be Solved by the Invention

The fluid control device of Patent Literature 1 needs a lot of parts for the function for indicating the opening and closing states so that the fluid control device becomes complicated and costs a lot.

An object of this invention is to provide a fluid control device which is capable of visually recognizing its opening and closing states with a simple configuration.

Means for Solving the Problems

A fluid control device according to this invention includes a body in which a fluid passage is disposed, a casing which is disposed above the body, a valve body which opens and closes the fluid passage, a valve rod which moves upward or downward so as to move the valve body in an opening or closing direction, a piston which is disposed at the valve rod, and a piston driving unit which drives the piston. The casing is formed so as to be opened upward, and the piston is disposed at an upper end portion of the valve rod such that when the valve rod is disposed at the upper position, an upper end portion of the piston is exposed from the opening of the casing.

The fluid control device is an opening and closing valve which is called an air-operating valve, but is not limited to this.

In such a fluid control device, usually, the valve rod, the piston and the like are covered with a casing which is provided with a top wall so that its opening and closing states cannot be seen from the outside. However, in the fluid control device according to this invention, the upper end portion of the piston, which moves upward and downward, is exposed from the opening of the casing so that its opening and closing states can be detected by visually recognizing the state of the piston. For example, by providing an indicator, such as a mark line, to the portion of the piston, where it is exposed from the opening of the casing when the valve rod is located at the upper position, and is contained in the casing when the valve rod is located at the lower position, the device can be detected to be "opened" when this indicator is visible, and detected to be "closed" when the indicator is unvisible. Accordingly, the opening and closing states of the fluid control device can be easily confirmed from the outside without using any other members for indicating the opening and closing states.

The number of piston may be one, or more than one. When the number of the piston is more than one, an upper end portion of one piston, which is located at the uppermost position, is exposed, and the other pistons are contained in the casing.

The piston driving unit moves the valve rod by applying driving gas (for example, compressed air) to the piston, and which may move the valve rod upward and downward, respectively, or which may be used together with an elastic member, such as a compressed coil spring, and while the valve rod is biased by the elastic member so as to be normally located at an opening position or a closing position, the piston driving unit moves the valve rod against the biasing force of the elastic member.

The fluid control device of this invention is suitable for a use in which its opening and closing stats are preferably confirmed by a limit switch. Namely, the upper end portion of the piston is exposed from the opening of the casing so that when this fluid control device is to be used, the limit switch which is capable of detecting the position of the piston can be easily attached, and therefore, controlling accuracies of various control apparatuses, in which this fluid control device is used, can be enhanced.

Under a state of closed fluid passage in which the valve rod is located at a downward position, the upper end surface of the piston may be protruded upward from the upper end surface of the casing, or, under a state of closed fluid passage in which the valve rod is located at a downward position, the upper end surface of the piston may be flush with the upper end surface of the casing. The latter is preferable in terms of an easiness of visual recognition.

The fluid control device may be so called double piston-type, and a piston is disposed also at an intermediate portion of the valve rod. A through hole may be disposed at the piston which is disposed at an upper end portion of a valve rod, and the upper end portion of the valve rod may be inserted into a lower portion of this through hole. An upper portion of the through hole may be configured to be a driving gas introducing portion, and a driving gas introducing chamber may be formed below each of the pistons. Inside the valve rod, there may be formed an axial direction passage which extends downward from the driving gas introducing portion, and a radial direction passage which communicates with each of the driving gas introducing chambers from the axial direction passage. With this, the configuration of a piston driving unit can be simplified, and the movement of the valve rod can be performed accurately.

The fluid control device may be so called single piston type which includes a single piston disposed at an upper end portion of a valve rod. The valve rod may include an upper half portion which is integrally disposed at the piston, and a lower half portion which is screwed with this upper half portion. A driving gas introducing chamber may be formed below the piston, and a driving gas introducing portion may be disposed so as to be opened upward at the piston upper portion. There may be formed at a piston lower portion and a valve rod upper end portion an axial direction passage which is connected with the driving gas introducing portion, and a radial direction passage which communicates with the driving gas introducing chamber from the axial direction passage. Also in this case, the configuration of a piston driving unit can be simplified, and the movement of the valve rod can be performed accurately.

In any cases of the single piston type and the double piston type, the driving gas introducing portion is formed by applying a screw processing to the piston. Accordingly, the casing does not require a screw processing for forming the driving gas introducing portion so as to be easily manufactured.

Note that, in this specification, the terms of up and down mean the up and down on the sheets of the drawings (the body side is the down, and the casing side is the up). However, these up and down are defined for convenience, and the up and the down may be reversed, or the up and the down may be used as left and right.

Advantageous Effects of the Invention

According to the fluid control device of this invention, the casing is formed so as to be opened upward, and the piston is disposed at the upper end portion of the valve rod such that the piston upper end portion is exposed from the opening of the casing when the valve rod is located at the upper position, so that the opening and closing states can be visually recognized by confirming the state of the piston.

Figure 1:
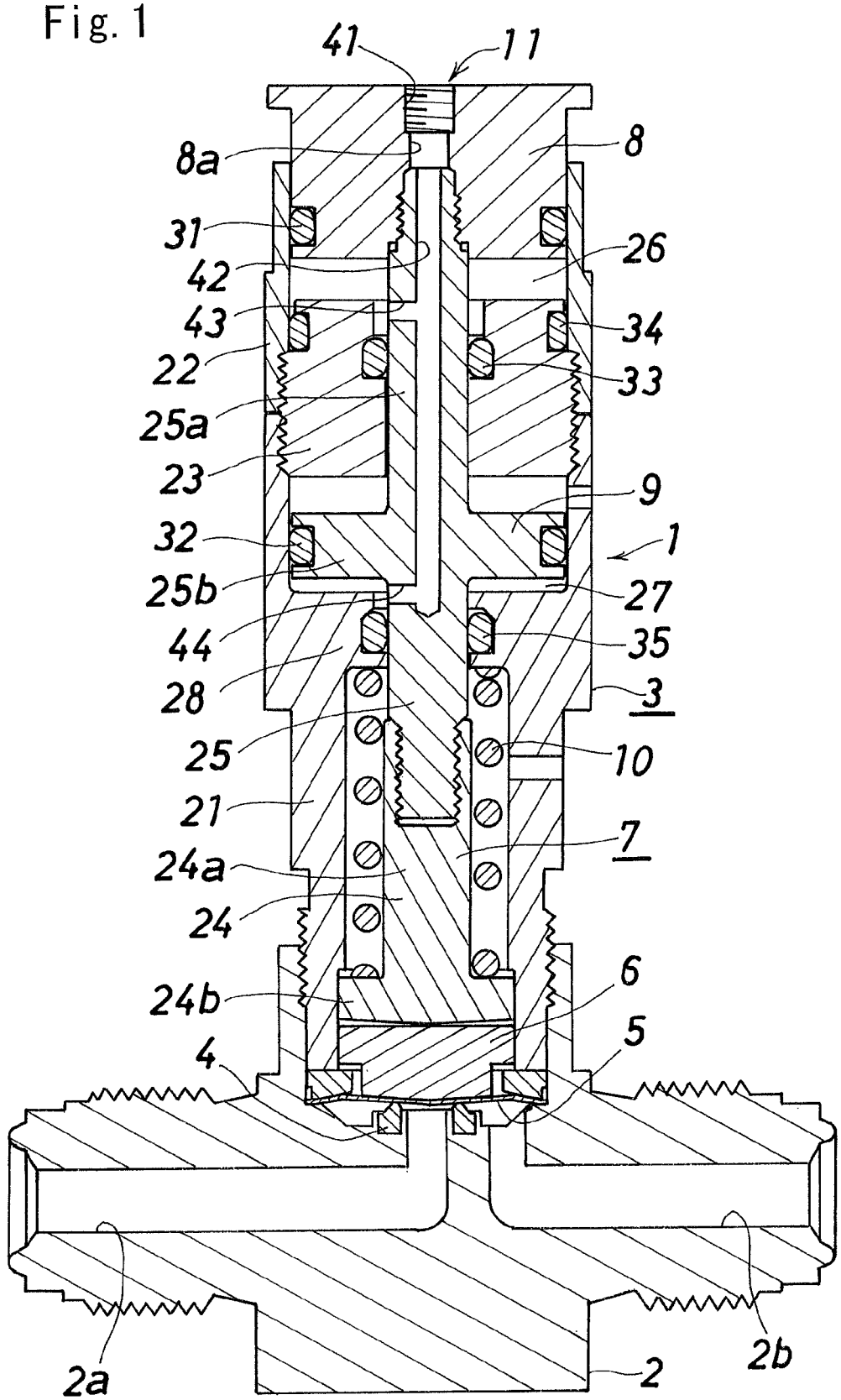
FIG. 1 is a vertical cross-sectional view illustrating a closing state of a first embodiment of a fluid control device according to this invention.

EXPLANATION OF REFERENCE SIGNS (1): flow rate control apparatus
(2): body
(2a), (2b): fluid passages
(3): casing
(5): diaphragm (valve body)
(7): valve rod
(8): first piston
(8a): through hole
(9): second piston
(11): piston driving unit
(26): first driving gas introducing chamber
(27): second driving gas introducing chamber
(41): driving gas introducing portion
(42): axial direction passage
(43), (44): radial direction passages
(51): fluid control device
(52): body
(52a), (52b): fluid passages
(53): casing
(55): diaphragm (valve body)
(57): valve rod
(58): first piston
(58a): through hole
(59): second piston
(61): piston driving unit
(76): first driving gas introducing chamber
(77): second driving gas introducing chamber
(81): driving gas introducing portion
(82): axial direction passage
(83), (84): radial direction passages
(91): fluid control device
(92): body
(92a), (92b): fluid passages
(93): casing
(95): diaphragm (valve body)
(97): valve rod
(98): first piston
(98a): through hole
(100): piston driving unit
(106): driving gas introducing chamber
(111): driving gas introducing portion
(112): axial direction passage
(113): radial direction passage
(104): stem (lower half portion of valve rod)
(105a): stem piston shaft portion (upper half portion of valve rod)

MODES FOR CARRYING OUT THE INVENTION

An embodiment of this invention is described with reference to the drawings hereunder. In the following descriptions, the terms of up and down, mean the up and down on the sheet of drawing.

Figure 2:
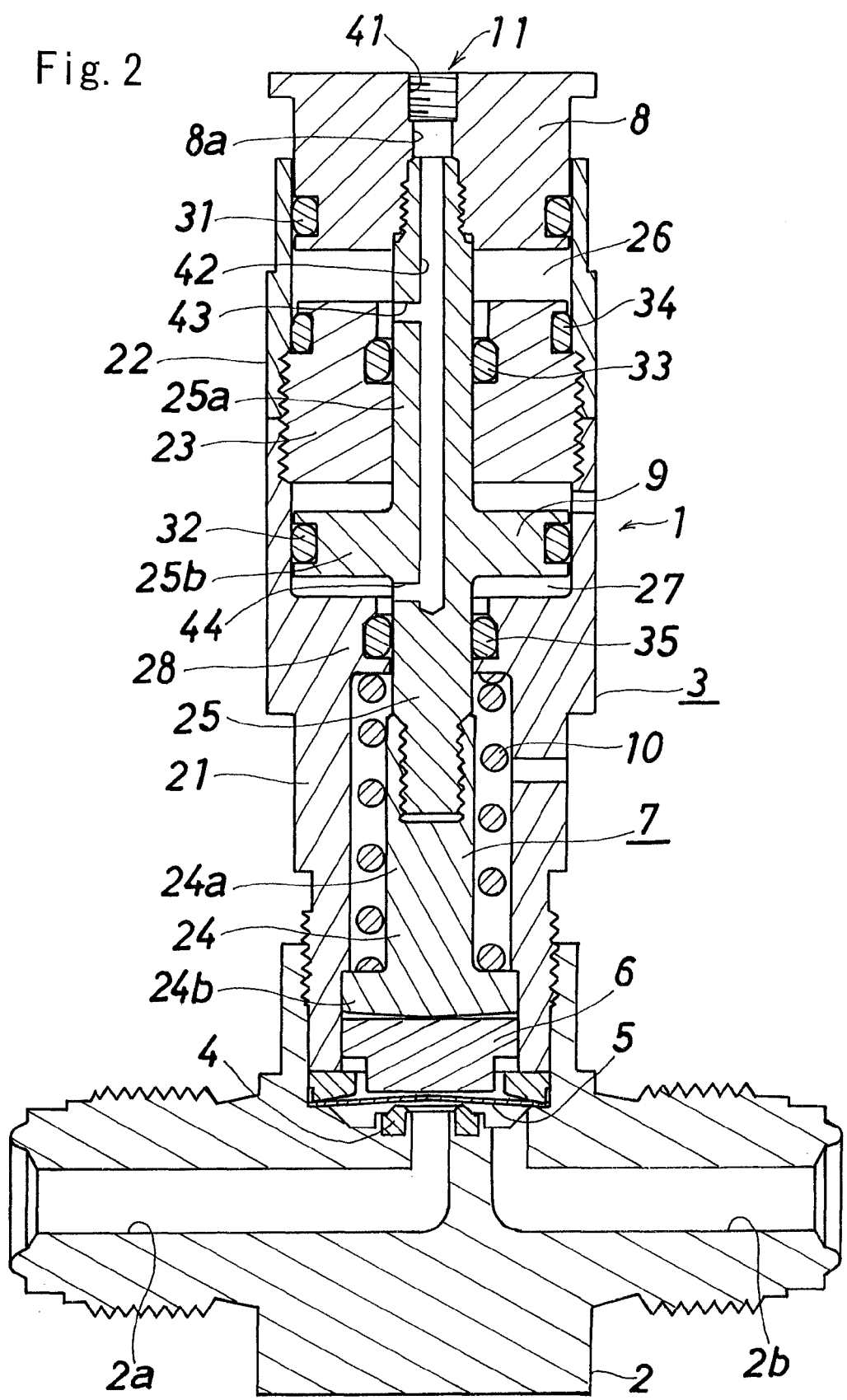
FIG. 2 is a vertical cross-sectional view illustrating an opening state of the same.

FIGS. 1 and 2 illustrate a first embodiment of a fluid control device according to this invention. The fluid control device (1) includes a body (2) in which a fluid inflow passage (2a) and a fluid outflow passage (2b) are disposed, a casing (3) which is disposed above the body (2), an annular valve seat (4) which is disposed at the circumferential edge of the fluid inflow passage (2a), a diaphragm (valve body) (5) which opens and closes the fluid passage (2a) when being pressed against the annular valve seat (4), or released from the same, a diaphragm pressing member (6) which presses the diaphragm (5) downward, a valve rod (7) which is disposed in the casing (3) so as to move upward or downward, thereby moving the diaphragm (5) in an opening or closing direction, two levels of upper and lower pistons which are disposed at the valve rod (7) (a first piston (8) at the upper side and a second piston (9) at the lower side), a compressed coil spring (elastic member) (10) which biases the valve rod (7) downward, and a piston driving unit (11) which drives the first and second pistons (8), (9).

The casing (3) includes a lower casing (21) which is fixed to the body (2), and an upper casing (22) which is combined with the lower casing (21) by a connector (23).

The valve rod (7) is formed by two parts (a stem (24) and a stem piston (25)). The stem (24) includes a shaft portion (24a) where a female thread portion is disposed at its upper portion, and a flange portion (24b) which is disposed at the lower end portion of the shaft portion (24a). The lower surface of the flange portion (24b) is abutted against the diaphragm pressing member (6). The stem piston (25) includes a shaft portion (25a) whose lower end portion is screwed with the shaft portion (24a) of the stem (24), and a flange portion (25b) which is integrally formed with the intermediate portion of the shaft portion (25a). The flange portion (25b) forms the second piston (9), and the combination of the stem (24) and the shaft portion (25a) of the stem piston (25) forms the valve rod (7).

The piston driving unit (11) is configured to apply driving gas to the respective pistons (8), (9) for moving the valve rod (7) upward, and therefore a first driving gas introducing chamber (26) at the upper side and a second driving gas introducing chamber (27) at the lower side are formed below the respective pistons (8), (9).

The connector (23), which combines the lower casing (21) and the upper casing (22), is formed in a ring shape having a through hole into which the valve rod (7) is fluid-tightly inserted so as to be vertically movable, and a male screw is formed at its outer circumference. At the upper end portion of the lower casing (21) and the lower end portion of the upper casing (22), there are formed female thread portions which are screwed with the male screw of the connector (23). When the lower casing (21) is screwed with the connector (23) from the lower side, and the upper casing (22) is screwed with the connector (23) from the upper side, respectively, the lower casing (21) and the upper casing (22) are abutted against each other so as to be combined. With this, at the positions above and below the connector (23), there are respectively formed spaces in which the first piston (8) and the second piston (9) move. The first piston (8) is disposed in the upper casing (22) so as to be vertically movable such that its lower surface faces the upper surface of the connector (23). The second piston (9) is disposed in the lower casing (21) so as to be vertically movable such that its upper surface faces the lower surface of the connector (23).

An O-ring (31) is disposed between the outer circumference of the first piston (8) and the upper casing (22), and also an O-ring (32) is disposed between the outer circumference of the second piston (9) and the lower casing (21). Moreover, an O-ring (33) is disposed between the inner circumference of the connector (23) and the outer circumference of the valve rod (7). A male screw is not disposed at the upper end portion of the connector (23), and an O-ring (34) is disposed between the upper end portion of the connector (23) and the upper casing (22). With this, the first piston (8) is disposed in the upper casing (22) so as to be vertically movable, and when driving gas is introduced into a first driving gas introducing chamber (26) which is formed between the first piston (8) and the connector (23), upward force is applied to the first piston (8). The second piston (9) is disposed in the lower casing (21) so as to be vertically movable, and when driving gas is introduced into a second driving gas introducing chamber (27) which is formed between the second piston (9) and an inward flange portion (28) of the lower casing (21), upward force is applied to the second piston (9).

In the middle of the inner circumference of the lower casing (21), there is formed the inward flange portion (28) into which the valve rod (7) is fluid-tightly inserted via the O-ring (35) so as to be vertically movable. The upper surface of this inward flange portion (28) is faced against the lower surface of the second piston (9) so as to form the second driving gas introducing chamber (27). Moreover, the compressed coil spring (10) is received by this inward flange portion (28) and a flange portion (24b) of a stem (24).

A male thread portion is disposed at the upper end portion of the valve rod (7) (a shaft portion (25a) of a stem piston (25)). A through hole (8a) is disposed at the first piston (8). In the lower portion of the through hole (8a), there is disposed a female thread portion which is screwed with the upper end portion of the valve rod (7). The valve rod (7) and the first piston (8) are connected with each other by inserting the upper end portion of the valve rod (7) into the lower portion of the through hole (8a) of the first piston (8), and screwing them together.

The upper casing (22) is formed so as to be opened upward, and the first piston (8) is disposed at the upper end portion of the valve rod (7) such that the piston upper end portion is exposed from the opening of the upper casing (22) when the valve rod (7) is located at the upper position.

The upper portion of the through hole (8a) of the first piston (8) is formed as a driving gas introducing portion (41) with which a piping for intruding the driving gas can be connected. There are formed in the valve rod (7) an axial direction passage (42) which extends downward from the driving gas introducing portion (41), a radial direction passage (43) which communicates with the first driving gas introducing chamber (26) from the intermediate portion of the axial direction passage (42), and a radial direction passage (44) which communicates with the second driving gas introducing chamber (27) from the lower end portion of the axial direction passage (42). With this, the driving gas introducing portion (41) is single so that the driving gas flows into the respective driving gas introducing chambers (26), (27) from this driving gas introducing portion (41).

Under a state in which the driving gas is not introduced into the respective driving gas introducing chambers (26), (27), the valve rod (7) is located at the closed position (lower position) by the biasing force of the compressed coil spring (10), and therefore the first piston (8) is also located at the lower position. When the driving gas is introduced into the respective driving gas introducing chambers (26), (27), the valve rod (7) is moved upward against the biasing force of the compressed coil spring (10), and therefore the first piston (8) is also moved to the upper position. Thus, the upper end portion of the vertically moving first piston (8) is exposed from the opening of the casing (3) so that the opening and closing states of the fluid control device (1) can be detected by confirming the state of the first piston (8).

Moreover, the upper end portion of the first piston (8) is exposed from the opening of the casing (3) so that a limit switch, which can detect the position of the first piston (8), can be attached by the user of this fluid control device (1). Furthermore, conventionally, a casing is provided with a top wall where a driving gas introducing portion is disposed. On the other hand, in the above-mentioned fluid control device (1), the driving gas introducing portion (41) is disposed at the first piston (8) so that the casing (3) can be formed easily.

In the above-mentioned case, the upper end portion of the first piston (8) is exposed from the opening of the casing (3) when the valve rod (7) is located at not only the upper position, but also the lower position (namely, when the fluid inflow passage (2a) is opened and also closed). Accordingly, a mark line is needed in order to detect the opening and closing states of the fluid control device (1). In this regard, as described below, under a state in which the valve rod (57) is located at a lower position so that the fluid passage is closed, an upper end surface of a piston (58) and an upper end surface of a casing (53) are made to be flush with each other so that the opening and closing states of the fluid control device (1) can be confirmed more easily.

Figure 3:
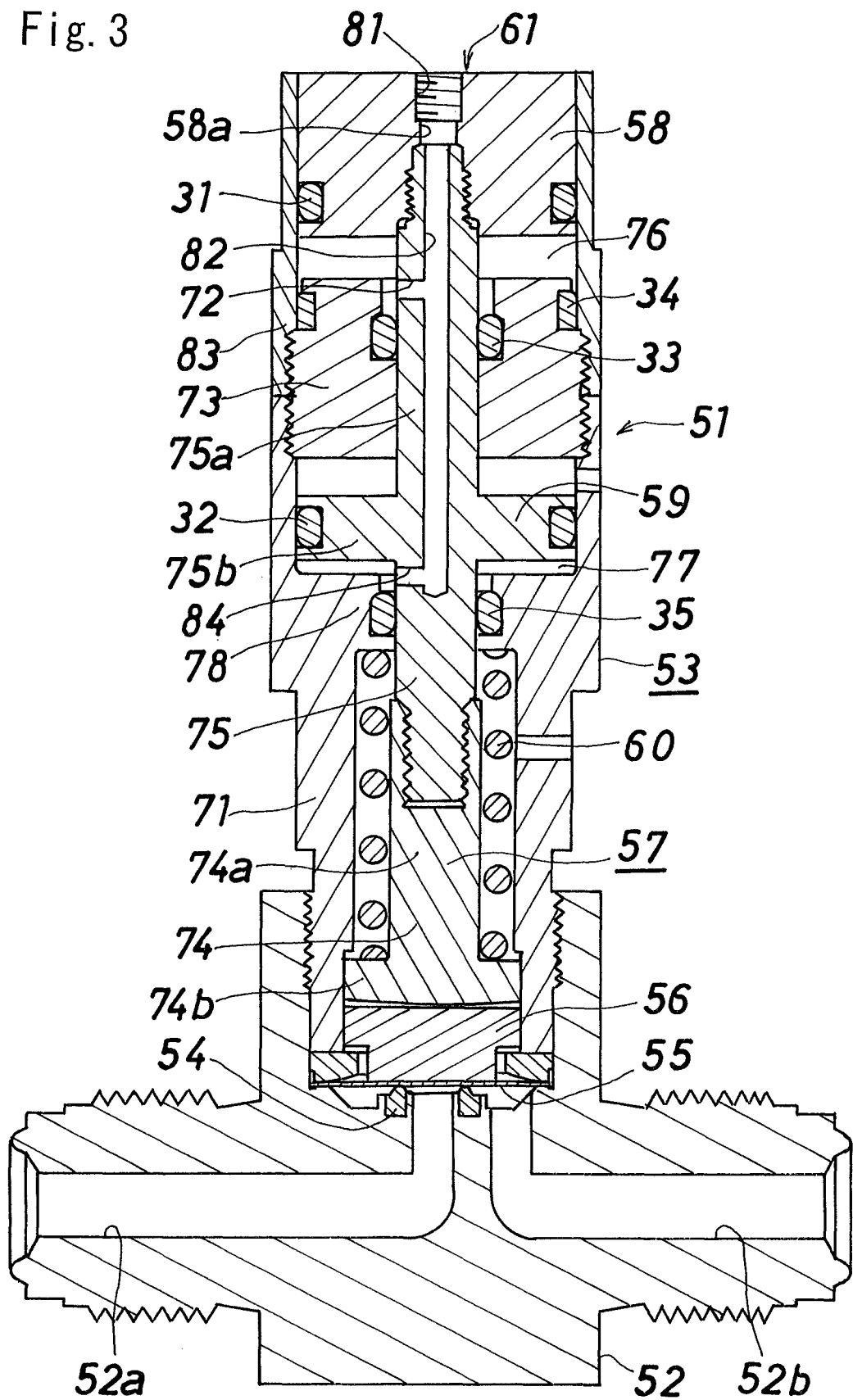
FIG. 3 is a vertical cross-sectional view illustrating a closing state of a second embodiment of the fluid control device according to this invention.
Figure 4:
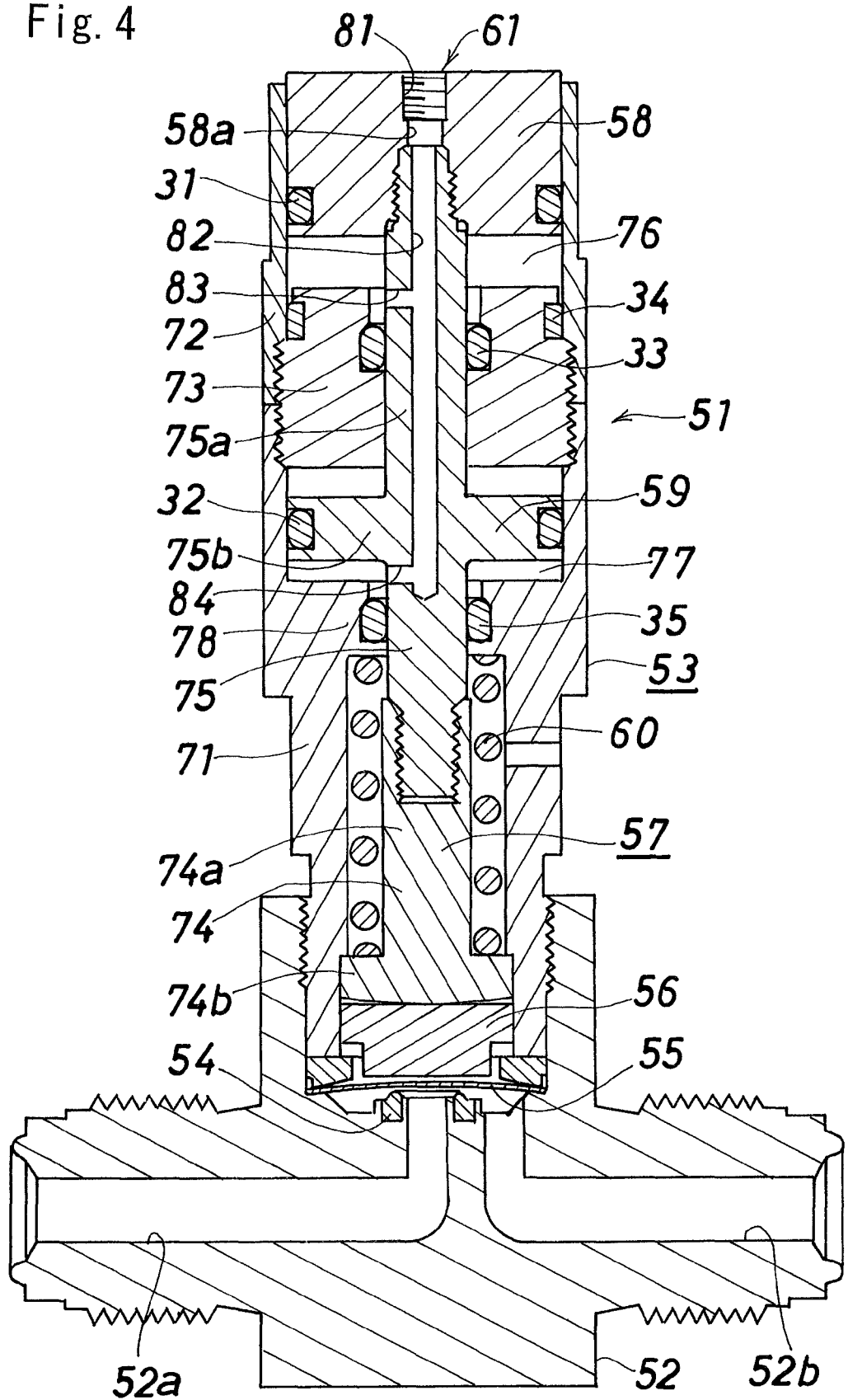
FIG. 4 is a vertical cross-sectional view illustrating an opening state of the same.

FIGS. 3 and 4 illustrate a second embodiment of a fluid control device according to this invention. The fluid control device (51) includes a body (52) in which a fluid inflow passage (52a) and a fluid outflow passage (52b) are disposed, a casing (53) which is disposed above the body (52), an annular valve seat (54) which is disposed at the circumferential edge of the fluid inflow passage (52a), a diaphragm (valve body) (55) which opens and closes the fluid passage (52a)

when being pressed against the annular valve seat (54), or released from the same, a diaphragm pressing member (56) which presses the diaphragm (55) downward, a valve rod (57) which is disposed in the casing (53) so as to move upward or downward, thereby moving the diaphragm (55) in an opening or closing direction, two levels of upper and lower pistons which are disposed at the valve rod (57) (a first piston (58) at the upper side and a second piston (59) at the lower side), a compressed coil spring (elastic member) (60) which biases the valve rod (57) downward, and a piston driving unit (61) which drives the first and second pistons (58), (59).

The casing (53) includes a lower casing (71) which is fixed to the body (52), and an upper casing (72) which is combined with the lower casing (71) by a connector (73).

The valve rod (57) is formed by two parts (a stem (74) and a stem piston (75)). The stem (74) includes a shaft portion (74a) where a female thread portion is disposed at its upper portion, and a flange portion (74b) which is disposed at the lower end portion of the shaft portion (74a). The lower surface of the flange portion (74b) is abutted against the diaphragm pressing member (56). The stem piston (75) includes a shaft portion (75a) whose lower end portion is screwed with the shaft portion (74a) of the stem (74), and a flange portion (75b) which is integrally formed with the intermediate portion of the shaft portion (75a). The flange portion (75b) forms the second piston (59), and the combination of the stem (74) and the shaft portion (75a) of the stem piston (75) forms the valve rod (57).

The piston driving unit (61) is configured to apply driving gas to the respective pistons (58), (59) for moving the valve rod (57) upward, and therefore a first driving gas introducing chamber (76) at the upper side and a second driving gas introducing chamber (77) at the lower side are formed below the respective pistons (58), (59).

The connector (73), which combines the lower casing (71) and the upper casing (72), is formed in a ring shape having a through hole into which the valve rod (57) is fluid-tightly inserted so as to be vertically movable, and a male screw is formed at its outer circumference. At the upper end portion of the lower casing (71) and the lower end portion of the upper casing (72), there are formed female thread portions which are screwed with the male screw of the connector (73). When the lower casing (71) is screwed with the connector (73) from the lower side, and the upper casing (72) is screwed with the connector (73) from the upper side, respectively, the lower casing (71) and the upper casing (72) are abutted against each other so as to be combined. With this, at the positions above and below the connector (73), there are respectively formed spaces in which the first piston (58) and the second piston (59) move. The first piston (58) is disposed in the upper casing (72) so as to be vertically movable such that its lower surface faces the upper surface of the connector (73). The second piston (59) is disposed in the lower casing (71) so as to be vertically movable such that its upper surface faces the lower surface of the connector (73).

An O-ring (31) is disposed between the outer circumference of the first piston (58) and the upper casing (72), and also an O-ring (32) is disposed between the outer circumference of the second piston (59) and the lower casing (71). Moreover, an O-ring (33) is disposed between the inner circumference of the connector (73) and the outer circumference of the valve rod (57). A male screw is not disposed at the upper end portion of the connector (73), and an O-ring (34) is disposed between the upper end portion of the connector (73) and the upper casing (72). With this, the first piston (58) is disposed in the upper casing (72) so as to be vertically movable, and when driving gas is introduced into a first driving gas introducing chamber (76) which is formed between the first piston (58) and the connector (73), upward force is applied to the first piston (58). The second piston (59) is disposed in the lower casing (71) so as to be vertically movable, and when driving gas is introduced into a second driving gas introducing chamber (77) which is formed between the second piston (59) and an inward flange portion (78) of the lower casing (71), upward force is applied to the second piston (59).

In the middle of the inner circumference of the lower casing (71), there is formed the inward flange portion (78) into which the valve rod (57) is fluid-tightly inserted via the O-ring (35) so as to be vertically movable. The upper surface of this inward flange portion (78) is faced against the lower surface of the second piston (59) so as to form the second driving gas introducing chamber (77). Moreover, the compressed coil spring (60) is received by this inward flange portion (78) and a flange portion (74b) of a stem (74).

A male thread portion is disposed at the upper end portion of the valve rod (57) (a shaft portion (75a) of a stem piston (75)). A through hole (58a) is disposed at the first piston (58). In the lower portion of the through hole (58a), there is disposed a female thread portion which is screwed with the upper end portion of the valve rod (57). The valve rod (57) and the first piston (58) are connected with each other by inserting the upper end portion of the valve rod (57) into the lower portion of the through hole (58a) of the first piston (58), and screwing them together.

The upper casing (72) is formed so as to be opened upward. In the valve rod (57) lower position illustrated in FIG. 3 (the state in which the fluid inflow passage (52a) is closed), the upper end surface of the first piston (58) is made to be flush with the upper end surface of the upper casing (72). In the valve rod (57) upper position illustrated in FIG. 4 (the state in which the fluid inflow passage (52a) is opened), the first piston (58) is disposed at the valve rod (57) upper end portion such that the piston upper end portion is exposed from the opening of the upper casing (72).

The upper portion of the through hole (58a) of the first piston (58) is formed as a driving gas introducing portion (81) with which a piping for intruding the driving gas can be connected. There are formed in the valve rod (57) an axial direction passage (82) which extends downward from the driving gas introducing portion (81), a radial direction passage (83) which communicates with the first driving gas introducing chamber (76) from the intermediate portion of the axial direction passage (82), and a radial direction passage (84) which communicates with the second driving gas introducing chamber (77) from the lower end portion of the axial direction passage (82). With this, the driving gas introducing portion (81) is single so that the driving gas flows into the respective driving gas introducing chambers (76), (77) from this driving gas introducing portion (81).

Under a state in which the driving gas is not introduced into the respective driving gas introducing chambers (76), (77), the valve rod (57) is located at the closed position (lower position) by the biasing force of the compressed coil spring (60), and therefore the first piston (58) is also located at the lower position. When the driving gas is introduced into the respective driving gas introducing chambers (76), (77), the valve rod (57) is moved upward against the biasing force of the compressed coil spring (60), and therefore the first piston (58) is also moved to the upper position. Thus, the upper end portion of the vertically moving first piston (58) is exposed from the opening of the casing (53), except that the upper end portion of the first piston (58) is just flush with the upper end surface of the casing (53) in the closed position. Accordingly, the opening and closing states of the fluid control device (51) can be detected by confirming the state of the first piston (58).

Thus, in this embodiment, as illustrated in FIG. 3, under the state in which the valve rod (57) is located at the lower position so that the fluid inflow passage (52a) is closed, the upper end surface of the first piston (59) and the upper end surface of the casing (53) (upper casing (72)) are made to be flush with each other. Accordingly, the difference from the valve rod (57) upper position illustrated in FIG. 4 (the state in which the fluid inflow passage (52a) is opened) becomes clearer so that the opening and closing states of the fluid control device (1) can be confirmed more easily.

Moreover, the upper end portion of the first piston (58) is exposed from the opening of the casing (53) so that a limit switch, which can detect the position of the first piston (58), can be attached by the user of this fluid control device (51). Furthermore, conventionally, a casing is provided with a top wall where a driving gas introducing portion is disposed. On the other hand, in the above-mentioned fluid control device (51), the driving gas introducing portion (81) is disposed at the first piston (58) so that the casing (53) can be formed easily.

Figure 5:
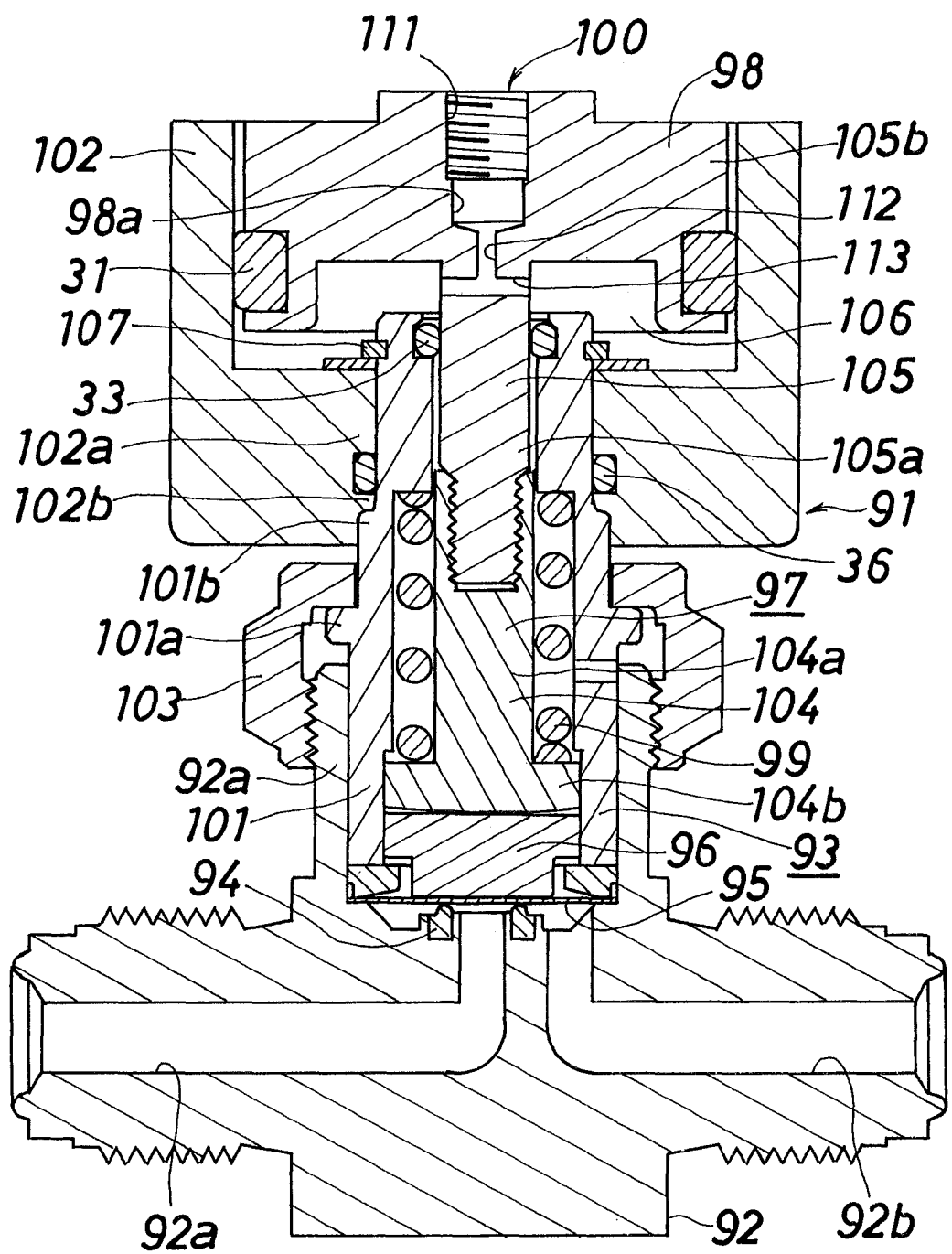
FIG. 5 is a vertical cross-sectional view illustrating a closing state of a third embodiment of a fluid control device according to this invention.
Figure 6:
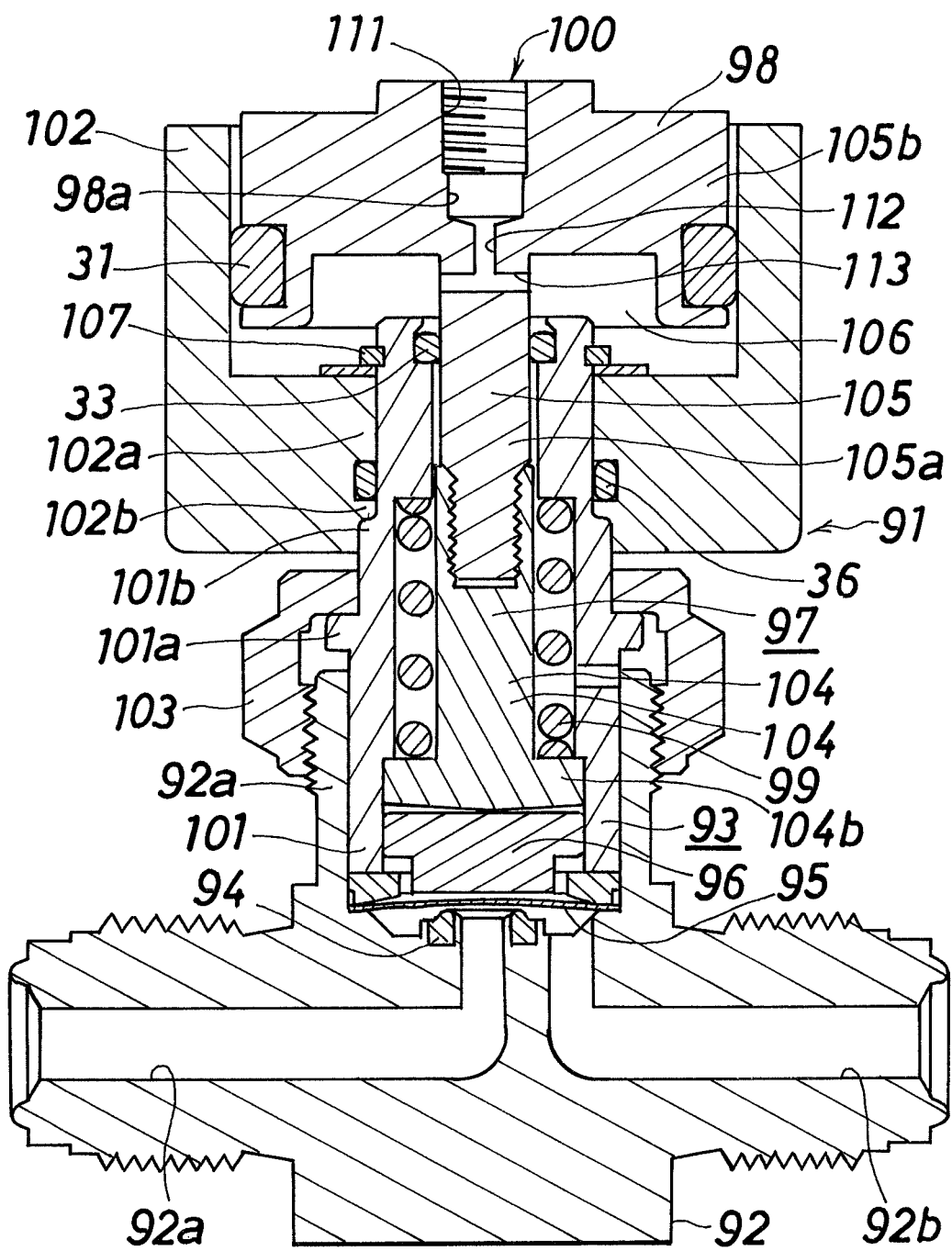
FIG. 6 is a vertical cross-sectional view illustrating an opening state of the same.

FIGS. 5 and 6 illustrate a third embodiment of a fluid control device according to this invention. The fluid control device (91) includes a body (92) in which a fluid inflow passage (92a) and a fluid outflow passage (92b) are disposed, a casing (93) which is disposed above the body (92), an annular valve seat (94) which is disposed at the circumferential edge of the fluid inflow passage (92a), a diaphragm (valve body) (95) which opens and closes the fluid passage (92a) when being pressed against the annular valve seat (94), or released from the same, a diaphragm pressing member (96) which presses the diaphragm (95) downward, a valve rod (97) which is disposed in the casing (93) so as to move upward or downward, thereby moving the diaphragm (95) in an opening or closing direction, a piston (98) which is disposed at the valve rod (97) upper end portion, a compressed coil spring (elastic member) (99) which biases the valve rod (97) downward, and a piston driving unit (100) which drives the piston (98).

The casing (93) includes a lower casing (101) which is fixed to the body (92), and an upper casing (102) which is combined with the lower casing (101).

The body (92) is provided with a tubular upward protruding portion (92a) on which a male thread portion is formed on its outer circumference, and a flange portion (101a) is disposed at an intermediate portion of the lower casing (101). Then, the flange portion (101a) is pressed downward by a cap nut (103) which is screwed with the upward protruding portion (92a) of the body (92) so that the lower casing (101) is fixed to the body (92).

The upper casing (102) includes an inward flange portion (102a) which is fit into a portion adjacent to the upper end portion of the lower casing (101). At an outer circumference of the lower casing (101), a step portion (101b) is disposed at a position higher than the flange portion (101a). A step portion (102b), which is disposed at an inner circumference of the inward flange portion (102a) of the upper casing (102), is received by the step portion (101b) of the lower casing (101). The upper end portion of the upper casing (102) is protruded above the inward flange portion (102a) of the lower casing (101), and this protruded portion is fit into a retaining ring (107) so that the upper casing (102) is combined with the lower casing (101).

The valve rod (97) is formed by two parts (a stem (104) and a stem piston (105)). The stem (104) includes a shaft portion (104a) where a female thread portion is disposed at its upper portion, and a flange portion (104b) which is disposed at the lower end portion of the shaft portion (104a). The lower surface of the flange portion (104b) is abutted against the diaphragm pressing member (96). The stem piston (105) includes a shaft portion (105a) whose lower end portion is screwed with the shaft portion (104a) of the stem (104), and a flange portion (105b) which is integrally formed at the upper end portion of the shaft portion (105a). The flange portion (105b) forms a piston (98), and a valve rod (97) is configured by the combination of the shaft portion (a valve rod upper half portion which is integrally disposed at the piston) (105a) of the stem piston (105), and a stem (a valve rod lower half portion which is screwed with the valve rod upper half portion (105a)) (104).

The piston driving unit (100) is configured to apply driving gas to the piston (98) so as to move the valve rod (97) upward. A driving gas introducing chamber (106) therefor is formed below the piston (98). A portion of the upper casing (102) above the inward flange portion (102a) is defined as a space in which the piston (98) moves. The piston (98) is disposed in the upper casing (102) so as to be vertically movable such that its lower surface is faced against the upper surface of the inward flange portion (102a) of the upper casing (102).

An O-ring (31) is disposed between the outer circumference of the piston (98) and the upper casing (102). An O-ring (33) is also disposed between the lower casing (101) and the valve rod (97). Moreover, an O-ring (36) is also disposed between the lower casing (101) and the upper casing (102). With this, the piston (98) is disposed in the upper casing (102) so as to be vertically movable, and when driving gas is introduced into a driving gas introducing chamber (106) which is formed between the piston (98) and the inward flange portion (102a) of the upper casing (102), upward force is applied to the piston (98).

The compressed coil spring (99) is received by the flange portion (104b) of the stem (104) and the step portion which is disposed at the lower casing (101).

The upper casing (102) is formed so as to be opened upward. In the valve rod (97) lower position illustrated in FIG. 5 (the state in which the fluid inflow passage (92a) is closed), the upper end surface of the piston (98) is made to be flush with the upper end surface of the upper casing (102). In the valve rod (97) upper position illustrated in FIG. 6 (the state in which the fluid inflow passage (92a) is opened), the piston (98) is disposed at the valve rod (97) upper end portion such that the piston upper end portion is exposed from the opening of the upper casing (102).

The piston (98) is provided with a through hole (98a), and the upper portion of the through hole (98a) is configured to be a driving gas introducing portion (111) with which a piping for introducing the driving gas can be connected. Moreover, in the inside from the lower end portion of the piston (98) to the upper end portion of the valve rod (97), there is formed a short axial direction passage (112) which extends downward from the driving gas introducing portion (111). In the inside of the upper end portion of the valve rod (97), there is formed a radial direction passage (113) which communicates with the driving gas introducing chamber (106) from the lower end portion of the axial direction passage (112). With this, the driving gas flows into the driving gas introducing chamber (106) from the driving gas introducing portion (111).

Under a state in which the driving gas is not introduced into the driving gas introducing chamber (106), the valve rod (97) is located at the closed position (lower position) by the biasing force of the compressed coil spring (99), and therefore the piston (98) is also located at the lower position. When the driving gas is introduced into the driving gas introducing chamber (106), the valve rod (97) is moved upward against the biasing force of the compressed coil spring (99), and therefore the piston (98) is also moved to the upper position. Thus, the upper end portion of the vertically moving piston (98) is exposed from the opening of the casing (93), except that the upper end portion of the piston (98) is just flush with the upper end surface of the casing (93) in the closed position. Accordingly, the opening and closing states of the fluid control device (91) can be detected by confirming the state of the piston (98).

Thus, in this embodiment, as illustrated in FIG. 5, under the state in which the valve rod (97) is located at the lower position so that the fluid inflow passage (92a) is closed, the upper end surface of the piston (98) and the upper end surface of the casing (93) (upper casing (102)) are flush with each other. Accordingly, the difference from the valve rod (97) upper position illustrated in FIG. 6 (the state in which the fluid inflow passage (92a) is opened) becomes clearer so that the opening and closing states of the fluid control device (91) can be confirmed more easily.

Moreover, the upper end portion of the piston (98) is exposed from the opening of the casing (93) so that a limit switch, which can detect the position of the piston (98), can be attached by the user of this fluid control device (91). Furthermore, conventionally, a casing is provided with a top wall where a driving gas introducing portion is disposed. On the other hand, in the above-mentioned fluid control device (91), the driving gas introducing portion (111) is disposed at the piston (98) so that the casing (93) can be formed easily.

INDUSTRIAL APPLICABILITY

According to this invention, the configuration for confirming the opening and closing states of the fluid control device from the outside is simplified so that its cost can be reduced, and the range of use of the fluid control device, in which the opening and closing states can be easily confirmed from the outside, can be widened.

The invention claimed is:
1. A fluid control device, comprising:
a body in which a fluid passage is disposed;
a casing disposed above the body;
a valve body which opens and closes the fluid passage;
a valve rod which moves upward and downward so as to move the valve body in an opening or closing direction;
a first piston disposed at the valve rod; and
a piston driving unit which drives the piston by introducing driving gas into a driving gas introducing chamber formed below the piston and applying driving gas to the piston, wherein:
the casing is formed so as to be opened upward; and
the first piston is disposed at an upper end portion of the valve rod such that a piston upper end portion is exposed from an opening of the casing when the valve rod is located at an upper position;
a second piston is disposed also at an intermediate portion of the valve rod;
a through hole is disposed at the piston which is disposed at the valve rod upper end portion, the valve rod upper end portion being inserted into a lower portion of the through hole;
an upper portion of the through hole is configured to be a driving gas introducing portion with which a piping for introducing the driving gas can be connected, a first driving gas introducing chamber is formed below the first piston, and a second driving gas introducing chamber is formed below the second piston; and
an axial direction passage which extends downward from the driving gas introducing portion, and a radial direction passage which communicates with each driving gas introducing chamber from the axial direction passage are formed inside the valve rod,
wherein the first piston comprises a body to form the first driving gas introducing chamber and a flange disposed at the upper end portion of the body, an O-ring is disposed between an outer circumference of the body and the casing, and the flange is exposed from the opening of the casing,
characterized in that an outer diameter of the body of the first piston is equal to an inner diameter of the casing, an outer diameter of the flange of the first piston is larger than the inner diameter of the casing and the driving gas introducing portion with which the piping for introducing the driving gas can be connected is provided in the body of the first piston which moves vertically, so that the first piston has function such as forming a driving gas introducing chamber, forming a driving gas introducing portion and forming a visual checking member.

2. The fluid control device according to claim 1, wherein:
the first piston is disposed singly at the valve rod upper end portion;
the valve rod includes an upper half portion which is integrally disposed at the first piston, and a lower half portion which is screwed with the upper half portion,
the driving gas introducing portion is disposed at a piston upper portion so as to be opened upward, and
the axial direction passage which is connected with the driving gas introducing portion, and the first radial direction passage which communicates with the first driving gas introducing chamber from the axial direction passage are formed at a piston lower portion and the valve rod upper end portion.

3. The fluid control device according to claim 1, wherein:
the casing includes: a casing lower portion fixed to the body; a casing upper portion; and a ring-shaped connector radially inward of the casing upper and lower portions for coupling the casing upper and lower portions together;
the ring-shaped connector and the piston form the driving gas introducing chamber below the piston; and
the casing lower portion has an inward flange portion so that the inward flange portion and the second piston form the driving gas introducing chamber below the second piston.

4. The fluid control device according to claim 1, further comprising a screw connecting the valve rod and the piston together.

5. The fluid control device according to claim 1, wherein:
an axial direction passage is formed inside the valve rod, the axial direction passage extending downward from the driving gas introducing portion;
a first radial direction passage is formed inside the valve rod, the first radial direction passage communicating with the first driving gas introducing chamber from the axial direction passage; and
a second radial direction passage is formed inside the valve rod, the second radial direction passage communicating with the second driving gas introducing chamber from the axial direction passage.

6. A fluid control device comprising:
a body defining a fluid passage;
a casing including a ring-shaped connector, a proximal end portion and a distal end portion defining an interior, wherein: the distal end portion is connected to the body;

and the ring-shaped connector is radially inward of the distal end portion and the proximal end portion so that the ring-shaped connected couples the distal end and proximal end portions together;

a valve assembly axially between the distal end portion and the body for opening and closing the fluid passage, the valve assembly having an annular valve seat surrounding the fluid passage and a valve body that closes the fluid passage when pressed against the annular valve seat;

a valve rod mounted for reciprocal motion in the interior for reciprocally moving the valve body between an opened position and a closed position;

a piston assembly coupled to the interior of the casing, the piston assembly including a piston coupled to the valve rod and a piston driving unit coupled to the piston for driving the piston and, in turn, the valve rod, wherein: a piston upper end portion is exposed from the interior of the casing at the proximal end when the valve rod is in the open position; and the ring-shaped connector and the piston form a first driving gas introducing chamber below the piston so that pressure in the first gas introducing chamber drives the valve rod from the closed position to the open position;

a second piston coupled intermediate the piston and the valve rod;

a through hole is disposed at the piston which is disposed at the valve rod upper end portion, the valve rod upper end portion being inserted into a lower portion of the through hole; and an upper portion of the through hole is configured to be a driving gas introducing portion with which a piping for introducing the driving gas can be connected, wherein:

the valve rod defines a first radial direction passage and a first axial direction passage communicating with the first driving gas introducing chamber for providing air pressure to create an opening force against the piston to move the valve rod to the open position;

the casing lower portion has an inward flange portion so that the inward flange portion and the second piston form a second driving gas introducing chamber below the second piston;

the valve rod defines a second radial direction passage and a second axial direction passage communicating with the second driving gas introducing chamber for providing air pressure to create an opening force against the piston to move the valve rod to the open position; and the first piston comprises a body and a flange disposed at the upper end portion of the body, an O-ring is disposed between an outer circumference of the body and the casing, and the flange is exposed from the opening of the casing, characterized in that an outer diameter of the body of the first piston is equal to an inner diameter of the casing, an outer diameter of the flange of the first piston is larger than the inner diameter of the casing and the driving gas introducing portion with which the piping for introducing the driving gas can be connected is provided in the body of the first piston which moves vertically, so that the first piston has function such as forming a driving gas introducing chamber, forming a driving gas introducing portion and forming a visual checking member.

7. The fluid control device according to claim 6, further comprising a spring coupled between the casing and the valve rod to create a closing force so that the valve assembly is normally in the closed position, wherein the valve rod defines a radial direction passage and an axial direction passage communicating with the first driving gas introducing chamber for providing air pressure to overcome the closing force to create an opening force against the piston to move the valve rod from the closed position to the open position.

8. A fluid control device comprising:

a body defining a fluid passage;

a casing including a ring-shaped connector, a proximal end portion and a distal end portion defining an interior, wherein the distal end portion is connected to the body and the ring-shaped connector is radially inward of the distal end portion and the proximal end portion so that the ring-shaped connector couples the distal end and proximal end portions together;

a valve assembly axially between the distal end portion and the body for opening and closing the fluid passage, the valve assembly having an annular valve seat surrounding the fluid passage and a valve body that closes the fluid passage when pressed against the annular valve seat;

a valve rod mounted for reciprocal motion in the interior for reciprocally moving the valve body between an opened position and a closed position;

a piston assembly coupled to the interior of the casing, the piston assembly including a first piston coupled to the valve rod so that driving the first piston drives the valve rod, wherein: a piston upper end portion is exposed from the interior of the casing at the proximal end when the valve rod is in the open position; and the ring-shaped connector and the first piston form a first driving gas introducing chamber below the first piston;

a second piston formed by the valve rod and intermediate the ring-shaped connector and the valve assembly, wherein the casing distal end portion has an inward flange portion so that the inward flange portion and the second piston form a second driving gas introducing chamber below the second piston;

a through hole is disposed at the piston which is disposed at the valve rod upper end portion, the valve rod upper end portion being inserted into a lower portion of the through hole; and an upper portion of the through hole is configured to be a driving gas introducing portion with which a piping for introducing the driving gas can be connected, wherein:

the valve rod defines a first radial direction passage and a first axial direction passage communicating with the first driving gas introducing chamber for providing air pressure to create an opening force against the first piston to move the valve rod to the open position;

the valve rod defines a second radial direction passage and a second axial direction passage communicating with the second driving gas introducing chamber for providing air pressure to create an opening force against the second piston to move the valve rod to the open position; and the first piston comprises a body and a flange disposed at the upper end portion of the body, an O-ring is disposed between an outer circumference of the body and the casing, and the flange is exposed from the opening of the casing, characterized in that an outer diameter of the body of the first piston is equal to an inner diameter of the casing, an outer diameter of the flange of the first piston is larger than the inner diameter of the casing and the driving gas introducing portion with which the piping for introducing the driving gas can be connected is provided in the body of the first piston which moves vertically, so that the first piston has function such as forming a driving gas introducing chamber, forming a driving gas introducing portion and forming a visual checking member.

* * * * *